(12) United States Patent
Kliskey (10) Patent No.: US 6,684,927 B1
(45) Date of Patent: Feb. 3, 2004

(54) TIRE MOUNTING TOOL

(75) Inventor: Roger Kliskey, Brimfield, OH (US)

(73) Assignee: Summit Tool Company, Akron, OH (US)

( * ) Notice: Subject to any disclaimer, the term of this patent is extended or adjusted under 35 U.S.C. 154(b) by 227 days.

(21) Appl. No.: 09/694,970

(22) Filed: Oct. 24, 2000

(51) Int. Cl.$^7$ .............................................. B60C 25/04
(52) U.S. Cl. ..................... 157/1.3; 157/1.17; 254/120
(58) Field of Search ..................... 157/1.1, 1.3, 1.17, 157/6; D8/14, 31, 88, 89; 254/27, 50.1, 131, 120, 131.5; 81/15.2, 121.1, 124.2, 124.7, 125.1, 448; 29/273

(56) References Cited

U.S. PATENT DOCUMENTS

| | | |
|---|---|---|
| 355,754 A | 1/1887 | Beck |
| 834,908 A | 11/1906 | Hussey |
| 951,200 A | 3/1910 | Pilliner |
| 1,567,025 A | 12/1925 | Allison |
| 1,741,801 A | 12/1929 | White |
| 1,829,804 A | 11/1931 | Loomis et al. |
| 2,112,661 A | 3/1938 | Abrahams .................. 157/6 |
| 2,188,211 A | 1/1940 | Tilson ........................ 157/6 |
| 2,226,757 A | 12/1940 | Ewell ......................... 157/6 |
| 2,294,271 A | 8/1942 | Bethard ...................... 157/6 |
| D134,799 S | 1/1943 | Taylor ....................... D8/31 |
| 2,311,789 A | 2/1943 | Taylor ........................ 157/6 |
| 2,344,704 A | 3/1944 | Krantz ........................ 157/6 |
| D142,931 S | 11/1945 | Bailey ....................... D8/31 |
| 2,399,146 A | 4/1946 | Schumann .................. 156/6 |
| D158,110 S | 4/1950 | Lutz .......................... D8/31 |
| D158,629 S | 5/1950 | Weynard ................... D8/89 |
| 2,571,517 A | 10/1951 | Aycock |
| 2,634,803 A | 4/1953 | Obee ......................... 157/6 |
| 2,712,350 A | 7/1955 | Henderson ................ 157/1.22 |
| 3,164,197 A | 1/1965 | Bishman et al. ........... 157/1.3 |
| 3,584,672 A | 6/1971 | DuQuesne ................. 157/1.22 |
| 3,717,193 A | * | 2/1973 | Craft ......................... 157/1.3 |
| 3,908,728 A | 9/1975 | DeMola .................... 157/1.22 |
| 4,306,052 A | 12/1981 | Bonk et al. ................ 157/1.3 |
| 4,436,134 A | 3/1984 | Gaither ..................... 157/1.3 |
| 4,527,607 A | 7/1985 | Gaither ..................... 157/1.3 |
| 4,919,184 A | 4/1990 | du Quesne ................ 157/1.3 |
| 5,123,470 A | 6/1992 | Tran ......................... 157/1.3 |
| 5,143,134 A | 9/1992 | Tran ......................... 157/1.3 |
| 5,213,146 A | 5/1993 | Onozawa ................... 157/1.3 |
| 5,265,661 A | 11/1993 | Tran ......................... 157/1.3 |
| 5,343,921 A | 9/1994 | Kusner ...................... 157/1.3 |
| 5,363,897 A | 11/1994 | Branch ..................... 157/1.3 |
| 5,417,270 A | 5/1995 | Brunner .................... 157/1.3 |
| 5,740,848 A | 4/1998 | Goracy ..................... 157/1.3 |
| D395,809 S | 7/1998 | Brown et al. .............. D8/31 |
| 5,806,578 A | 9/1998 | Gonzaga ................... 157/1.3 |
| D412,271 S | 7/1999 | Kliskey ..................... D8/31 |
| 5,979,532 A | * | 11/1999 | Wridt ....................... 157/1.3 |
| 6,179,032 B1 | 1/2001 | Diez ......................... 157/1.1 |
| 6,182,735 B1 | 2/2001 | du Quesne ................ 157/1.17 |
| 6,192,959 B1 | 2/2001 | Spaggiari ................. 157/1.28 |

FOREIGN PATENT DOCUMENTS

| | | |
|---|---|---|
| DE | 29505499 | 7/1995 |
| FR | 982185 | 6/1951 |

OTHER PUBLICATIONS

JC Whitney & Co, Catalog 564J, p. 163, 1994.
Myers Tire Supply Catalog, p. 71.

* cited by examiner

Primary Examiner—Joseph J. Hail, III
Assistant Examiner—Anthony Ojini
(74) Attorney, Agent, or Firm—Renner, Kenner, Greive, Bobak, Taylor & Weber (57) ABSTRACT

A mounting tool for mounting a tire onto a rim, the tool comprising a handle having a first end and a second end and a longitudinal axis; a first mounting end adjacent the first end of the handle; the first mounting end including a dependent shaft extending outwardly from the handle and a dependent tip extending from an end of the shaft; a wing located adjacent the shaft and inward of the tip and the wing including a wheel rim engaging surface extending outward beyond at least one side of the tip and in an orientation perpendicular to the longitudinal axis of the handle.

27 Claims, 10 Drawing Sheets

TIRE MOUNTING TOOL

TECHNICAL FIELD

The present invention generally relates to a tool for mounting tires to wheel rims aid, more particularly, to a manually operative tire mounting tool for providing mechanical advantage in mounting a tire to a wheel rim.

BACKGROUND ART

Pneumatic tires require repair or replacement from time to time because of sustained wear or damage. To effectuate such repair or replacement, it is generally required that the defective tire be removed from its associate wheel rim and a new or repaired tire remounted to the rim.

A variety of tools of varying configurations have been developed for providing a user with mechanical advantage in mounting a tire to a wheel rim. Such tools typically comprise an elongate bar having a handle at one end and an opposite working end adapted for insertion between the bead of a tire and its associate wheel rim. The working end of the tool frequently has a flattened or tapered portion to facilitate insertion of the working end between the tire bead and the wheel rim. The working ends of known tools are configured, in profile , as either straight, curved, or angled.

To utilize the implement, the tool working portion is inserted manually by the user between the bead of the tire and its associate wheel rim. Thereafter, the user applies pressure on the handle, making a lever of the tool and utilizing the wheel rim as a fulcrum. Pressure upon the handle causes the tool to engage the tire bead and move a segment of the bead inward, whereby disengaging the bead segment from the rim. The tool is then redeployed along the tire to an adjacent location and the procedure is repeated upon a corresponding adjacent bead segment. Repeated redeployment and utilization of the tool about the periphery of the tire pulls a sufficient length of the tire bead inward until the tire is free for removal from the rim in its entirely. In more recent years, machines have been developed which rotate the tire in conjunction with the use of the tool to alleviate the need for moving the tool.

While the prior art is replete with mounting tools, the basic design has not changed significantly over the years. Known designs, while working well to an extent, have proven less than satisfactory in providing all optimally functional tire mounting implement. Some known devices mount tubeless truck tires by using separate tools for each tire bead. A first mounting tool is used to pull the first bead of the tire and into the rim. Thereafter, a second mounting tool is inserted to press the second bead behind the rim to complete the mounting procedure. Separate implements, however, increase cost and complicates the tire changing procedure.

Other known designs use a straight bar having a tip that angles downwardly from the longitudinal plane of the tool. The downwardly turned tip, while providing an advantage in creating a pronounced fulcrum, makes insertion of the tool between the tire bead and wheel rim relatively more difficult. Moreover, dislodging the angled tip of such a tool is frequently problematic and laborious. A further deficiency in such known tools is that their configuration does nothing to inhibit migration of the tire upwardly along the handle during use. With pressure being applied to the sidewall, the bead of the tire tends to move away from the rim and upward along the tool, decreasing the applied leverage of the tool. The profile of known straight tools does not inhibit this undesirable consequence. A further deficiency exists in known tire mounting tools. To force the bead of a tire below a rim flange, a substantial segment of the sidewall must be compressed inward a significant extent. Such a deflection requires substantial force. To compensate, the user generally must progress about the tire in small increments, pressuring adjacent small portions or bites of the bead below the rim flange. As the user progressively moves the tool around the rim mounting the bead in a series of bites, the bead becomes progressively more taut and difficult to manipulate. Toward the end of the mounting process, the bead is extremely taut about the rim and difficult to manipulate, making insertion of the tool increasingly difficult. Known tools are typically difficult to insert and remove from between a taut tire bead and a wheel rim.

Moreover, known tools that incorporate a bend proximate the tire mounting tip experience a further difficulty. As th bend of the tool working end is pressed against the front edge of the bead to work the tool underneath the bead, the tool often catches on the rim flange. In order to avoid catching on the rim flange, the tool must be inserted by the user beneath the bead with the tool working end angled upward. Such an angle of insertion, however, is generally not available because the tool handle typically exceeds the rim diameter and the handle cannot be brought below the level of the bead without striking the rim. Finally, a further disadvantage exists in that the tool impinges against the sidewall of the tire during leverage activity. Due to the considerable force required to deflect the last bite of tire bead inward, the pressure exerted by the tool against the tire sidewall is considerable and may result in damage to the tire.

Consequently, there is a need for a mounting tool that is more easily inserted between the bead and the rim and, at the conclusion of its intended operation, more easily removed. There is a further need for a mounting tool that has an inwardly angled tip that can be readily inserted between a tire rim and an overlapping tire bead. There is a further need for a mounting tool that focuses mounting leverage toward the tire bead, including a downwardly directed force component, and applies such leverage without pressing against the tire sidewall during the mounting procedure. Moreover, such a tool should provide structural means for inhibiting the tire bead from sliding upwardly along the tool during the mounting procedure so that optimal leverage is not lost.

SUMMARY OF THE INVENTION

It is therefore, an object of the present invention to provide a tire mounting tool that is easier to insert between the tire bead and the wheel rim and easier to remove therefrom.

It is a further object of the present invention to provide a tire mounting tool having a working end tip that can be removed from between the tire bead and the wheel rim with minimal force.

It is a further object of the present invention to provide a mounting tool having structural means for mechanically assisting the user in removing the tool working end tip from between the tire bead and wheel rim.

It is a further object of the present invention to provide a mounting tool that positively engages the wheel rim rather than the tire during the process of removing die tool working end tip from between the tire bead and the wheel rim.

It is a further object of the present invention to provide a symmetrical flange operable from either side of the tool in the removal of the tool working end tip from between a tire bead and wheel rim.

It is a further object of the present invention to provide a tire mounting tool that is more easily inserted between a tire bead and a wheel rim and more easily removed therefrom.

It is a further object of the present invention to provide a tire mounting tool having a working end tip that is configured to readily allow the tip to slide between the tire bead and the wheel rim flange.

It is a further object of the present invention to provide a tire mounting tool that inhibits an upward migration of the tire bead along the tool shaft during use.

It is a further object of the present invention to provide a tire mounting tool including means for applying a downward force against the bead.

The aforementioned objects of the invention are achieved generally in a mounting tool for mounting a tire onto a rim. The tool comprises an elongate handle having opposite first and second ends and an offset mounting end at the first handle end. The mounting end includes a remote tip and a wing positioned inward of and adjacent to the tip. The wing extends outward beyond at least one side of the tip and provides a positive wheel rim engaging surface. So located, the wheel rim engaging surface of the wing is positioned to engage a wheel rim and provide a fulcrum by which a user may dislodge the tip of the tool from between a tire bead and the wheel rim. The tip is configured for ready insertion between the tire bead and the wheel rim and includes advantageously angled first and second tip segments that intersect at a knuckle. The shaft of the tool at the mounting end further includes a shoulder for inhibiting the tire bead from migrating up the mounting end during the application of leveraging force. A second mounting end is located at the second handle end and includes a tip configured to assist in mounting the second bead of the tire to the wheel rim.

Accordingly, the aforementioned objects of the invention are achieved by the preferred embodiment of the subject invention which is described in detail below and illustrated by the accompanying drawings.

DETAILED DESCRIPTION OF THE INVENTION

Figure 5A:
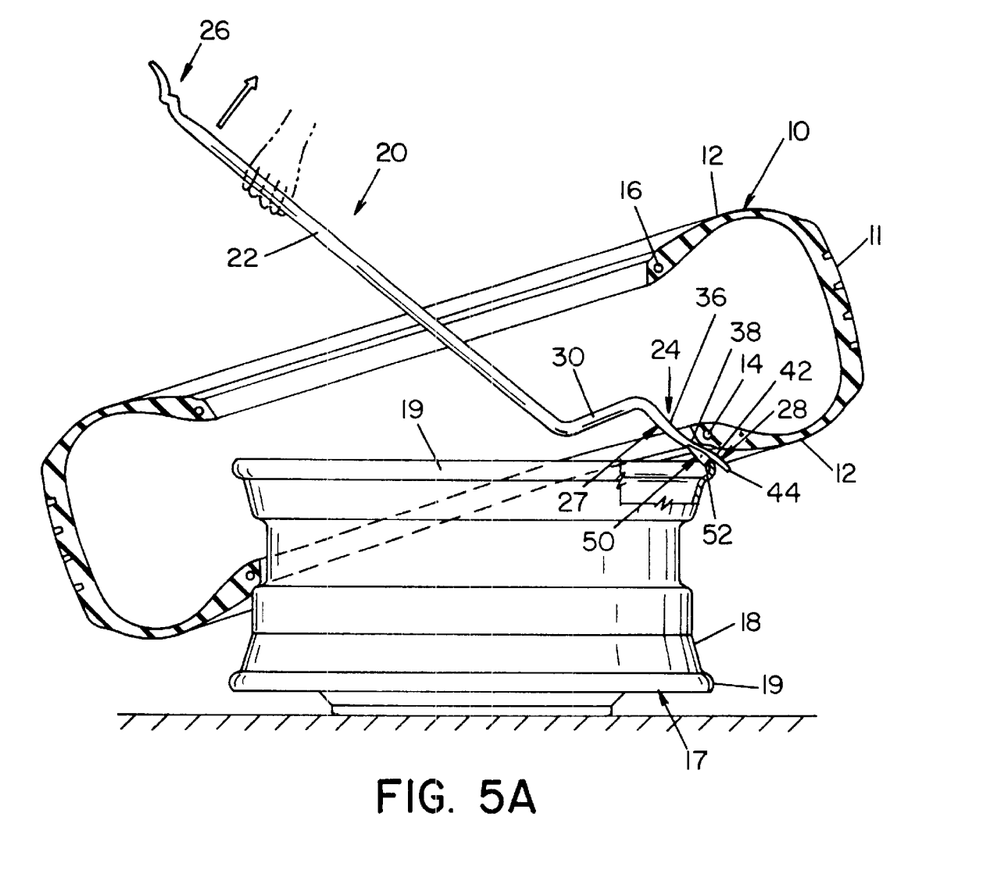
FIG. 5A is a partially schematic side elevational view of a tire, rim, and mounting tool showing the mounting of a first tire bead to the wheel rim by a first mounting end of the mounting tool.

As shown in FIG. 5A, a mounting tool, generally referred to by the numeral 20 in the accompanying drawings, is used to manually mount a tire 10 comprising, generally, a tread 11, a pair of sidewalls 12, a first bead 14, and a second bead 16. The tire 10 mounts onto a wheel rim 17 having an interior surface 18 and a pair of flanges 19.

Figure 1:
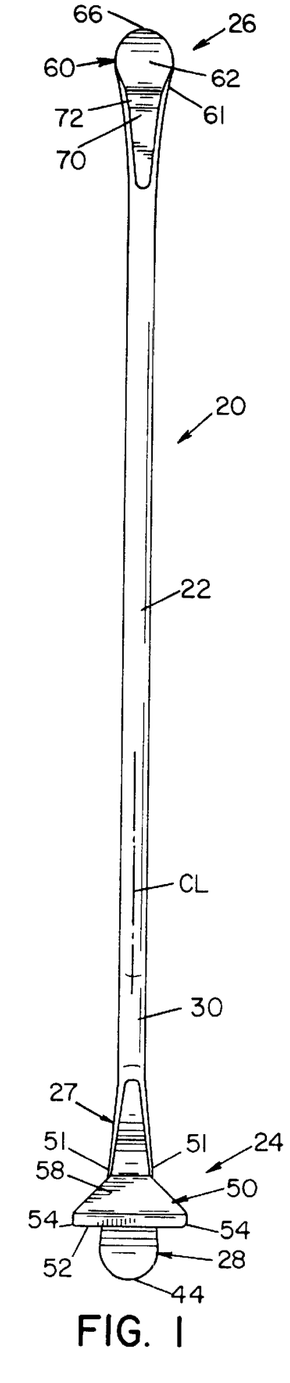
FIG. 1 is a front elevational view of a mounting tool according to the present invention.

With reference to FIG. 1, mounting tool 20 generally includes an elongate handle 22 terminating at a first end 24. Mounting tool 20, in the preferred embodiment, further includes a second end 26 opposite to first end 24. The second end 26 may be incorporated into a separate companion tool, having a separate handle 22 if so desired. The utilization of separate tools, while feasible, is not preferred in that separate tools complicate the mounting procedure somewhat and adds to the overall cost of the tooling. Accordingly, it is preferable that ends 24, 26 be incorporated as opposite ends to a single handle 22.

As shown, first end 24 and second end 26 are mounted at opposite terminal ends of handle 22. The mounting tool 20 may, if so desired, be constructed from component parts. The handle 22 and ends 24, 26 may be separately formed and attached together in an assembly operation by suitable attachment hardware. Preferably, however, for efficiency of manufacture, the tool 20 is fabricated as one piece as shown. Furthermore, each component 22, 24, and 26 may be made of the same or different materials. Wood, metal, or polymeric material of suitable structural strength to withstand the mounting forces may be employed in the fabrication of the tool. Moreover, as can be appreciated, the mounting tool components 22, 24 and 26 may be constructed as either hollow or solid. In the preferred embodiment, mounting tool 20 is constructed of a solid steel forging.

Figure 2:
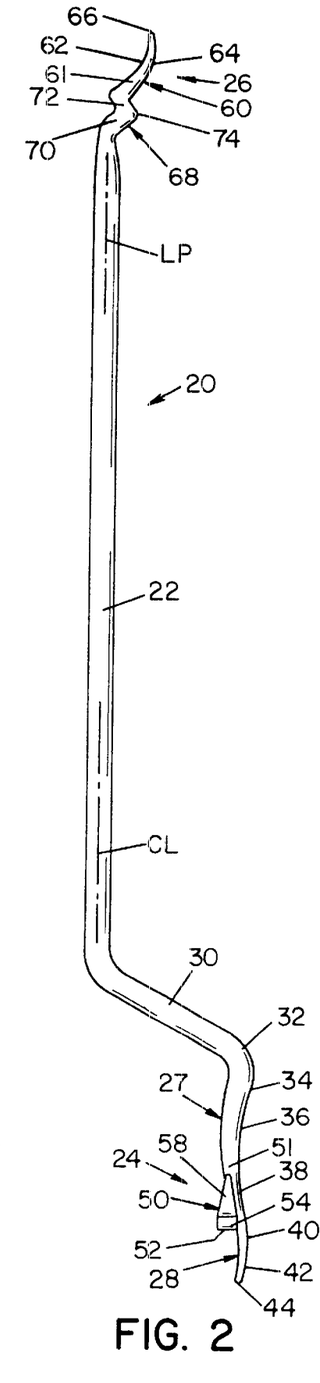
FIG. 2 is a right side elevational view thereof.

First end 24 of mounting tool 20 generally includes an axially extending shaft 27 and a tip 28. Shaft 27 may extend coaxially with the longitudinal axis of handle 22 or may, as in the preferred embodiment, be axially offset from the longitudinal axis of handle 22 by an offset segment 30. Offset segment 30 may be curved, straight, or angled as shown. Referring to FIG. 2, offset segment 30 extends outwardly and downward at angle of forty-five degrees from handle 22, whereby positioning the longitudinal axis of shaft 27 in a parallel, spaced apart relation to a longitudinal axis center line CL of handle 22. So configured, as will be appreciated from FIG. 5A, the offset allows shaft 27 to fit more easily between the rim 17 and second bead 16 of the tire 10 when mounting first bead 14. Shaft 27 depends downward as shown in FIGS. 1, 2, and 5A from a lower end of offset segment 30 and is generally parallel to the longitudinal axis of the handle 22. Shaft 27 is formed integrally with offset segment 30, and the joint 32 there between is formed on a radius to reduce the chance of damaging tire 10 as will be appreciated from the discussion below.

Shaft 27 includes all inwardly directed raised shoulder portion 34 proximate joint 32. It should be understood that raised surface 34 may be constructed in any known manner but is preferably formed as a protrusion on the upper surface 36 of shaft 27. So configured, joint 32 is located outboard of shaft 27 and merges with shaft 27 via the raised shoulder portion 34. As will be described more fully below, raised portion 34 prevents beads 14, 16 of the tire 10 from sliding upwardly along the surface 36 of first end 24.

Figure 3:
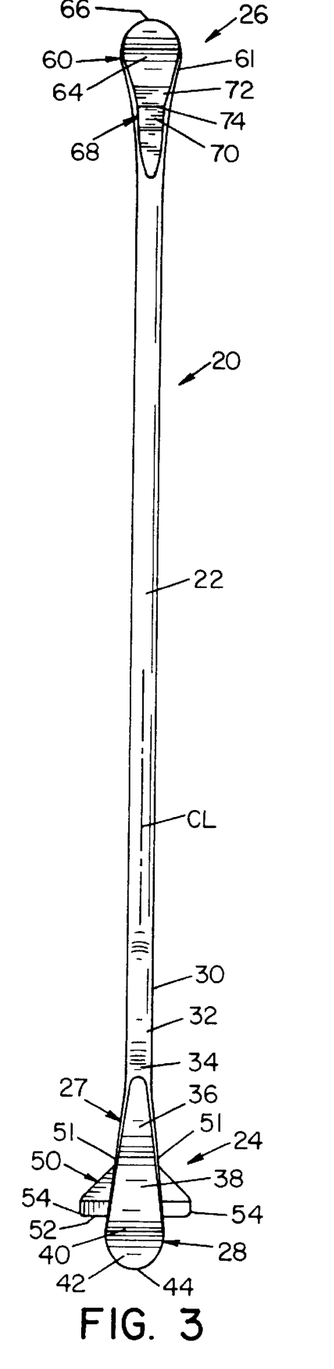
FIG. 3 is a rear elevational view thereof.

The dependent tip 28 includes a first segment 38 and a second segment 42 intersecting at a knuckle 40. The first segment 38 is joined to a lower end of the shaft 27 and depends outward therefrom at angle, terminating at the knuckle 40. From knuckle 40, the second segment 42 of tip 28 extends inwardly at a complimentary angle. The complimentarily angled first and second segments 38, 42 provide tip 28 with an optimum shape for easy insertion between a tire bead and a wheel rim. As shown in FIG. 3, the shaft 27 and first segment 38 broaden in width dimension from the handle 22 downward, having a widest width dimension at knuckle 40. Second segment 42 of tip 28 narrows from the knuckle 40 to all upwardly curved lower edge 44 of tip 28. Edge 44, while it may be of any shape, is preferably is rounded to facilitate its insertion between a tire bead and a wheel rim. To further facilitate insertion, the shaft 27 tapers from top to bottom toward tip 28. The tip 28 may similarly taper in thickness from the top to the bottom edge 44 or it may be generally flat.

With continued reference to FIGS. 1, 2, and 3, first and 24 further includes a wing 50 mounted adjacent to tip 28. Wing 50 is generally planer and extends outwardly in opposing directions from the center line CL of handle 22, such that an edge 52 of wing 50 extends outwardly in opposite directions from the sides 51, 51 of tip 28. While it is preferable that the wing 50 have portions which extend on opposite sides of the tip 28, it should be understood that wing 50 may alternatively be configured to extend outwardly on only one side of tool end 24 if so desired without departing from the invention. Further, as shown, wing 50 is preferably of deltoid shape symmetrically disposed relative to the center-line CL. Wing 50, as will be appreciated from the discussion below, is used to remove tip 28 from between the tire beads 14, 16 and the wheel rim as the tire is sequentially mounted. The edge 52 extends laterally of tip 28 to provide a fulcrum end 54 on either side of the tip 28 for engaging the wheel rim. When engagement of the end 54 against the wheel rim is established, the handle 22 is rotated laterally causing an extraction of the tip 28 from between the tire and the wheel rim 17. The symmetrical configuration of wing 50 allows the user to leverage the tip 28 free from either side.

As can be appreciated, the wing 50 may be of any shape providing a wheel rim engaging portion that extends laterally beyond at least one side of the tip 28. Examples of which include, but are not limited to, a T-bar, an L-shaped member, a C-shaped member, or a delta-slhaped wing as shown. As explained, the protruding edge 52 creates the fulcrum when engaged with the wheel rim 17.

Figure 4:
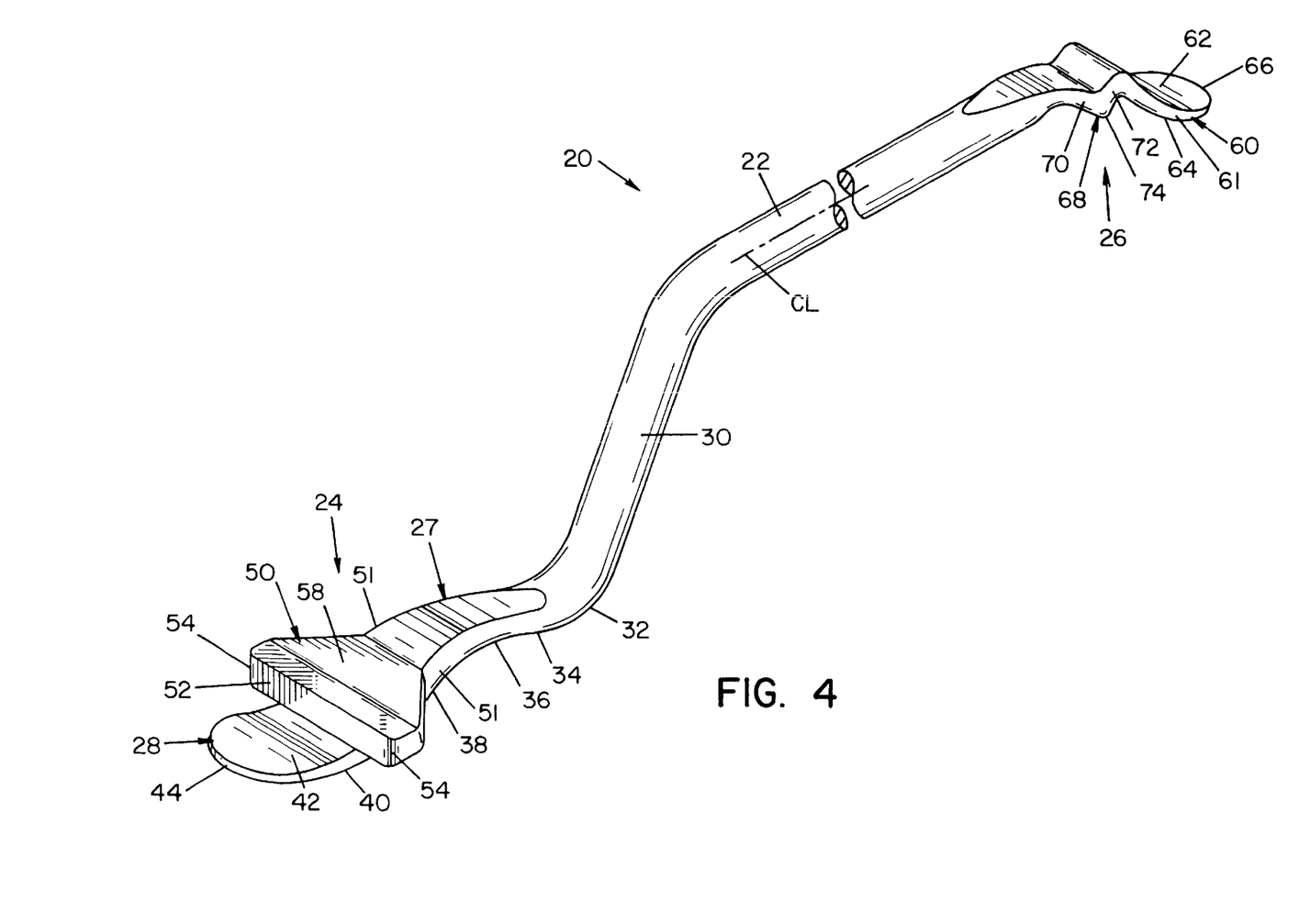
FIG. 4 is an enlarged perspective view of first and second mounting ends of the mounting tool configured according to the present invention.

With reference to FIG. 4, in the delta configuration, edge 52 may be connected to first end 24 beneath tip 28 by any known method. Although the location of edge 52 may be positioned at any point along the axis of first end 24, it is preferred that edge 52 be located axially above and in close proximity to knuckle 40 so as not to interfere with the insertion of a sufficient portion of tip 28. As can be appreciated, the edge 52 of the wing 50 can be formed to extend outside of sides 51 to a greater or lesser extent if so desired. Increasing the outward protrusion of the edge 52 will cause the end 54 to initiate contact with the rim 17 responsive to a relatively minimal rotation of the handle 22. A decrease ill the width dimension of the wing 50 will consequently require a relatively extensive rotation of the handle before the end 54 of edge 52 contacts the rim 17.

In the delta configuration, edge 52 is formed at the terminus of a tapered web 58, located adjacent to shaft 27, supporting the edge 52 in a plane substantially normal to the tip 28. As described previously, web 58 expands in width from top to bottom toward edge 52. In this way, forces created at edge 52 are directed toward shaft 27 and are more evenly distributed throughout the first end 24. Edge 52 is disposed generally perpendicular to the longitudinal plane of the handle 22 and the plane of tip 28.

Referring to FIGS. 4 and 5A–5C, first end 24 is used to mount first bead 14. As shown, tip 28 is inserted between first bead 14 and rim flange 19. The front edge 44 initially penetrates between first bead 14 and rim flange 19 and the angled surface of second segment 42 forces the first bead 14 away from tip 28 using the entry of tip 28.

Figure 5B:
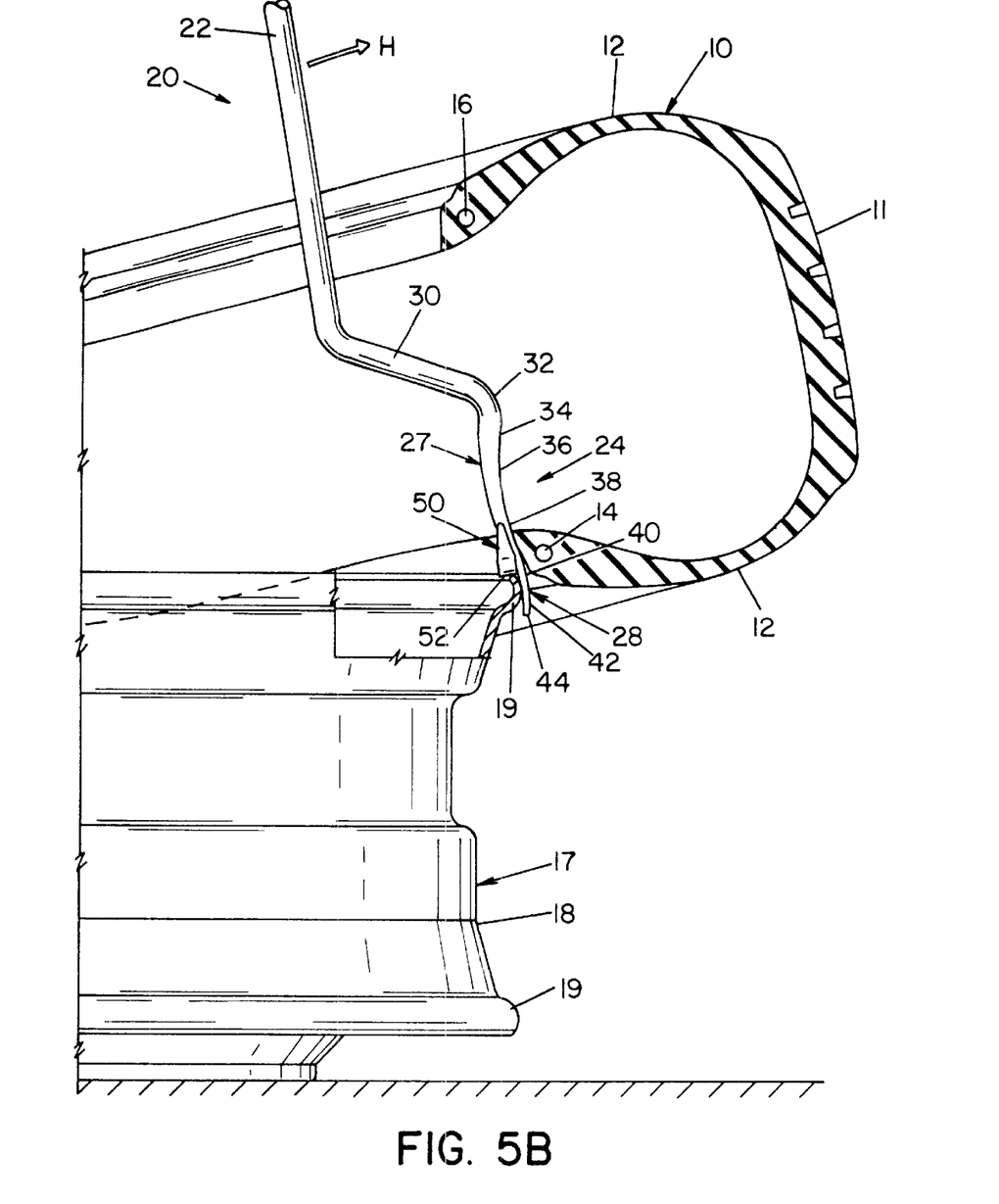
FIG. 5B is an enlarged side elevational view thereof showing a later position of the first bead during the mounting process.
Figure 5C:
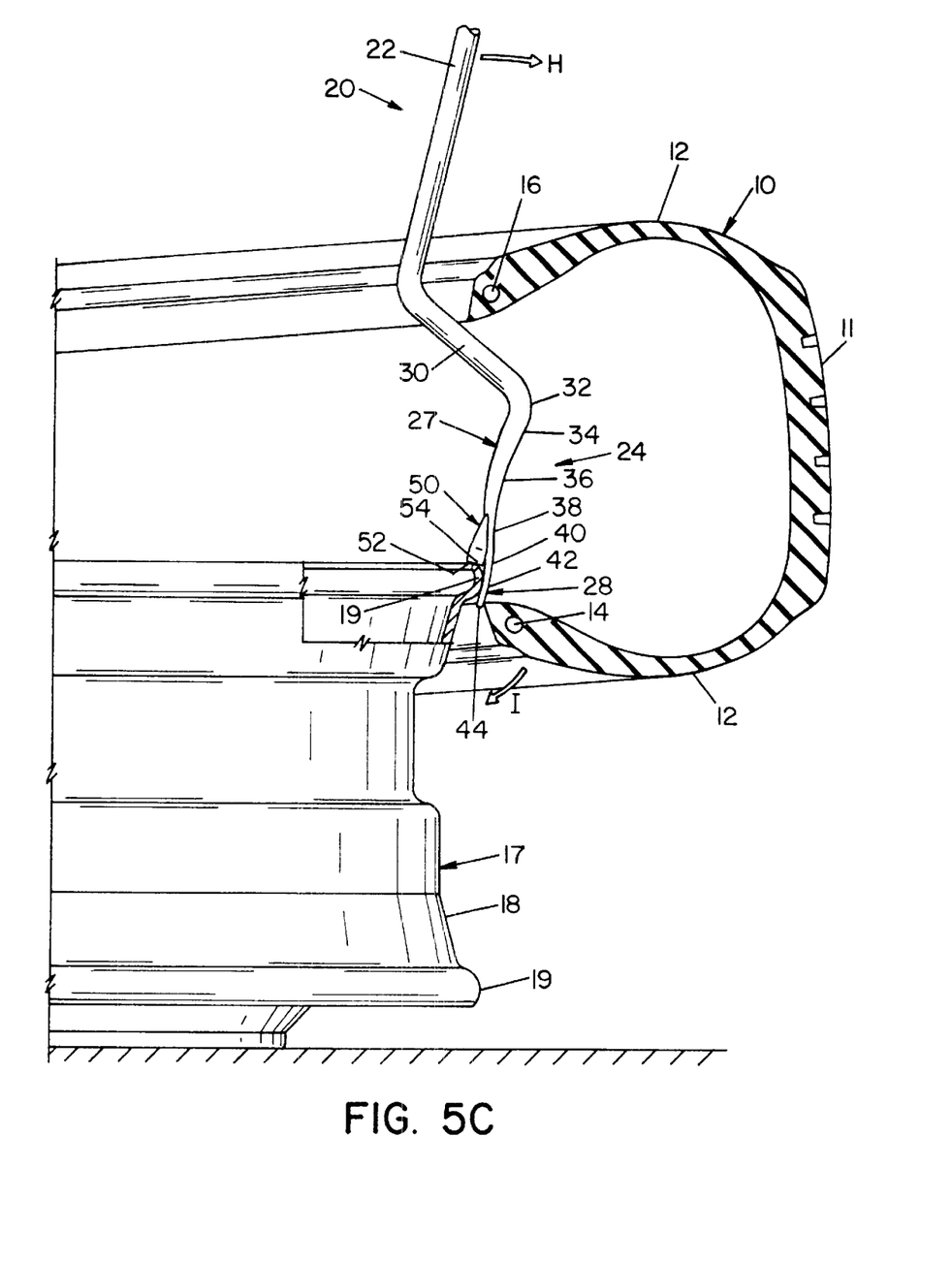
FIG. 5C is an enlarged side elevational view thereof showing the first bead passing the flange of the rim.

After knuckle 40 passes bead 14, the bead 14 may move inwardly against the surface of first segment 38. Eventually, edge 52 of wing 50 contacts the rim flange 19, FIG. 5A. From this position, the user rotates the handle 22 upward and, using the edge 52 as a fulcrum, leverage the first bead 14 over rim flange 19. Referring to FIG. 5B, the handle 22 is rotated away from the center of rim 17 in the direction of arrow H with the tip 28 and edge 52 contacting the rim flange 19. First segment 38 generally forces the first bead 14 outward as the handle 22 rotates clockwise. As can be appreciated, the first bead 14, as it is stretched, tends to move inward and migrate upward along shaft 27. The raised portion 34 of shaft 27, however, beneficially interferes with an upward movement of bead 14 along shaft 27 and traps the bead 14 between the raised portion 34 and the tip 28. So confined, the tip 28 and bead 14 remain in an optimal relative position for the continued application of maximum leverage. As the first end 24 continues to rotate, raised portion 34 forces the first bead 14 downward passed rim flange 19. As best shown in FIG. 5C, once the bead 14 is beyond rim flange 19, the inward upper of second segment 42 allows the first bead 14 to flex downward in the direction of arrow I until the first bead 14 eventually slips over the edge 44 of tip 28.

Figure 6A:
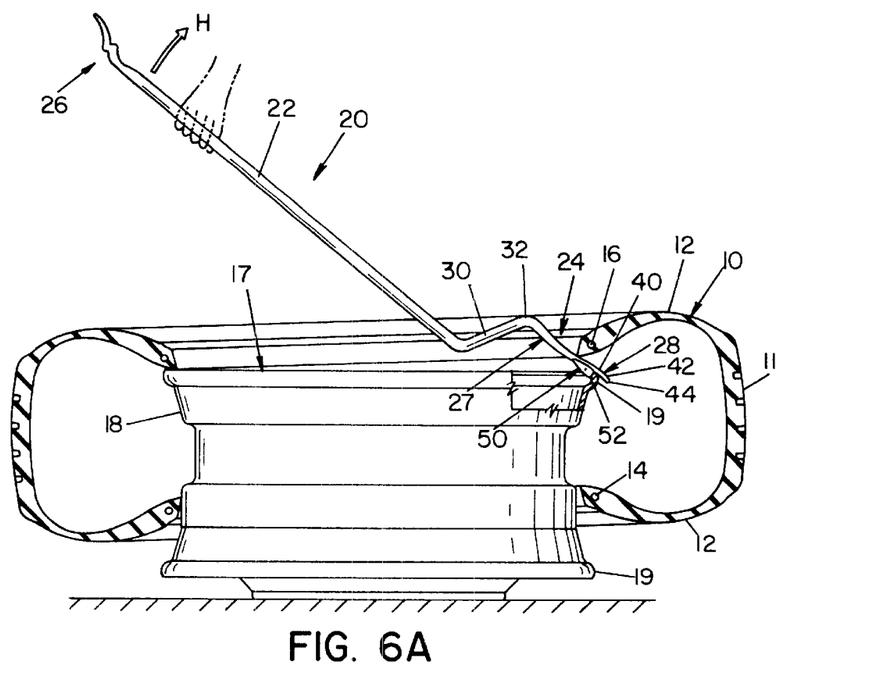
FIG. 6A is a partially schematic side elevational view of a tire, shown in section, a rim, and a mounting tool configured according to the present invention showing an initial mounting of a second bead of the tire.
Figure 6B:
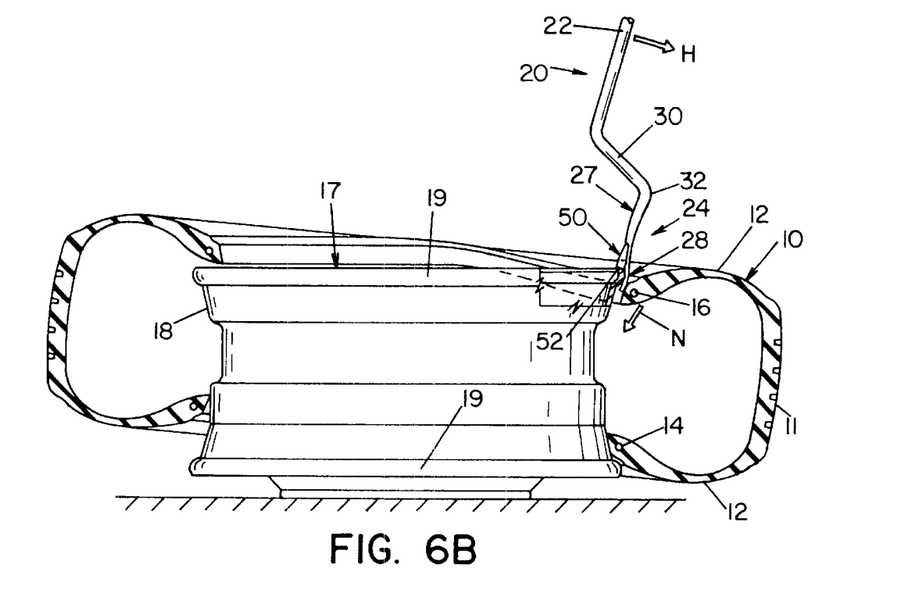
FIG. 6B is a side elevational view thereof showing the tool leveraging a portion of the second bead over the flange of the rim.
Figure 6C:
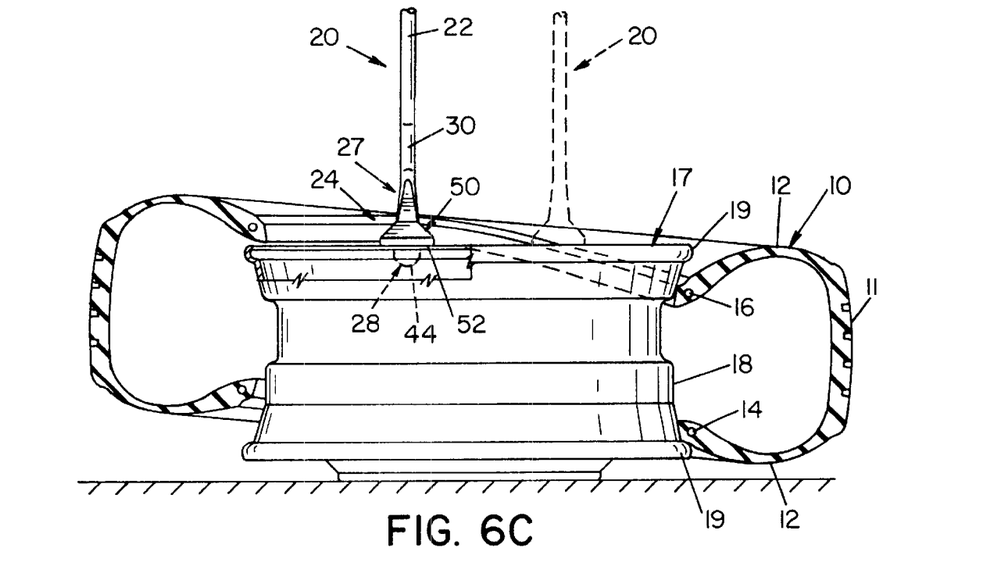
FIG. 6C is a partially schematic side elevational view schematically showing the successive mounting of portions of the second bead.
Figure 6D:
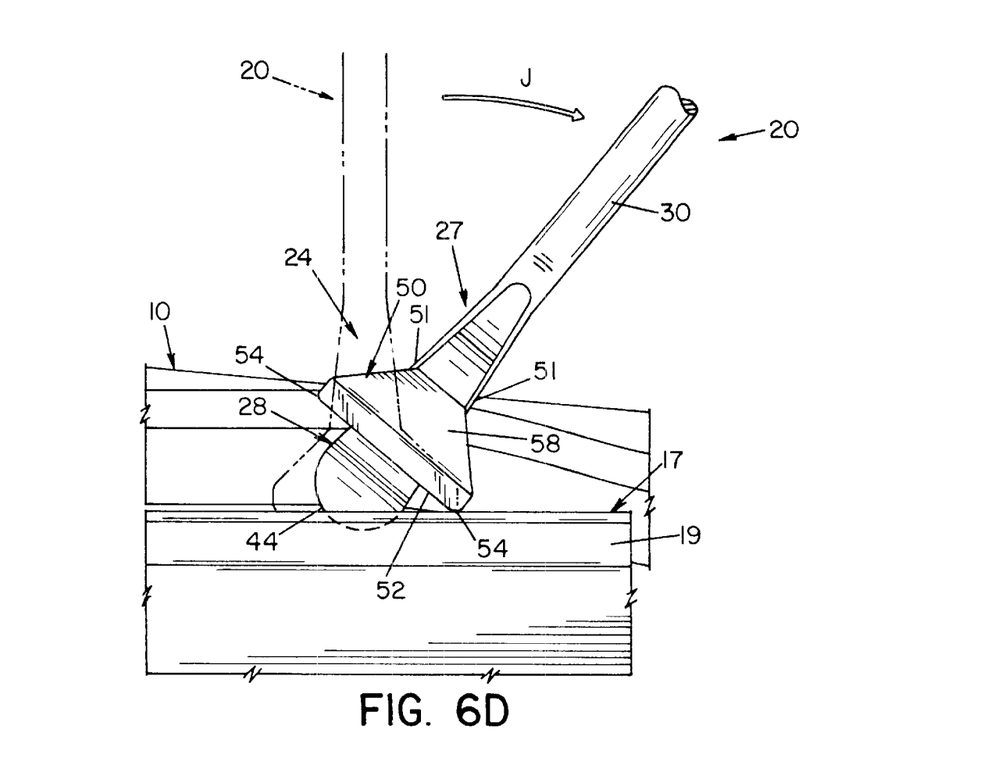
FIG. 6D is ail enlarged front elevational view of the first end of the mounting tool showing a removal of the tool from the inserted second bead.

With the first bead 14 mounted on rim 17, FIG. 6A, first end 24 is then used to mount second bead 16. As shown in FIGS. 6A–6C the second bead 16 is mounted in a similar fashion to first bead 14. Since first bead 14 is in place, second bead 16 must be progressively mounted to rim 17 with a series of insertion movements, commonly referred to as bites. With each bite, the mounting process described above is repeated for small radial sections of the second bead 16. With each bite, the second bead 16 becomes increasingly taut around rim 17 making removal of the tip 28 from between the second bead 16 and rim 17 increasingly difficult. As shown in FIG. 6D, protruding edge 52 greatly facilitates removal of tip 28 from its tight confinement between the increasingly taut second bead 16 and rim 17. In particular, tip 28 is removed by rotating handle 22 laterally in direction J, causing end 54 of edge 52 to contact rim 17. Upon contact, edge 52 acts as a fulcrum and handle 22 may be used to lever tip 28 out from between the second bead 16 and rim 17. As previously discussed, this process is repeated with each successive bite.

Figure 7A:
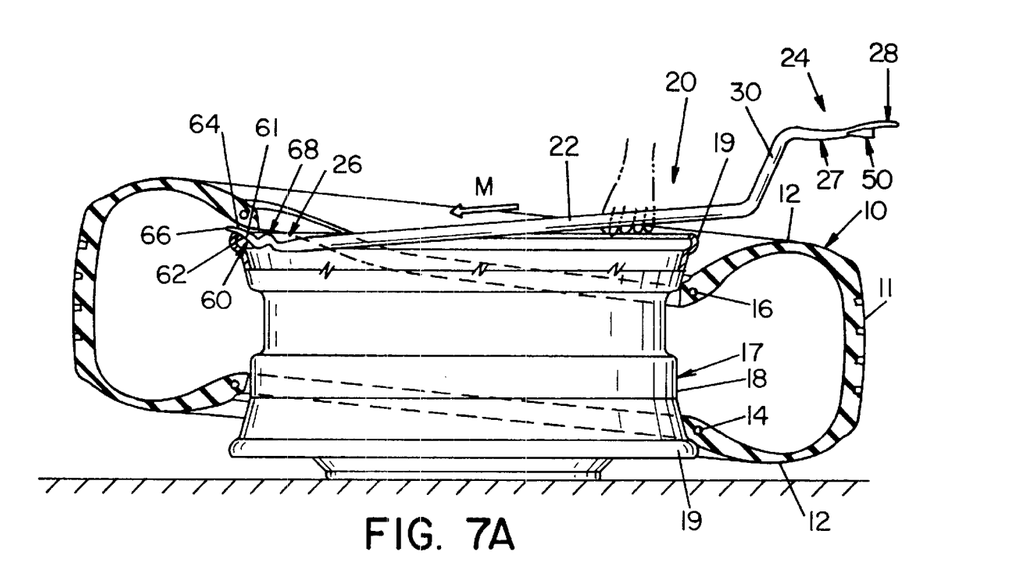
FIG. 7A is a partially schematic side elevational view showing a tire, in section; a rim; and a mounting tool configured according to the present invention shown in position to mount the final portion of the second bead over the rim.
Figure 7B:
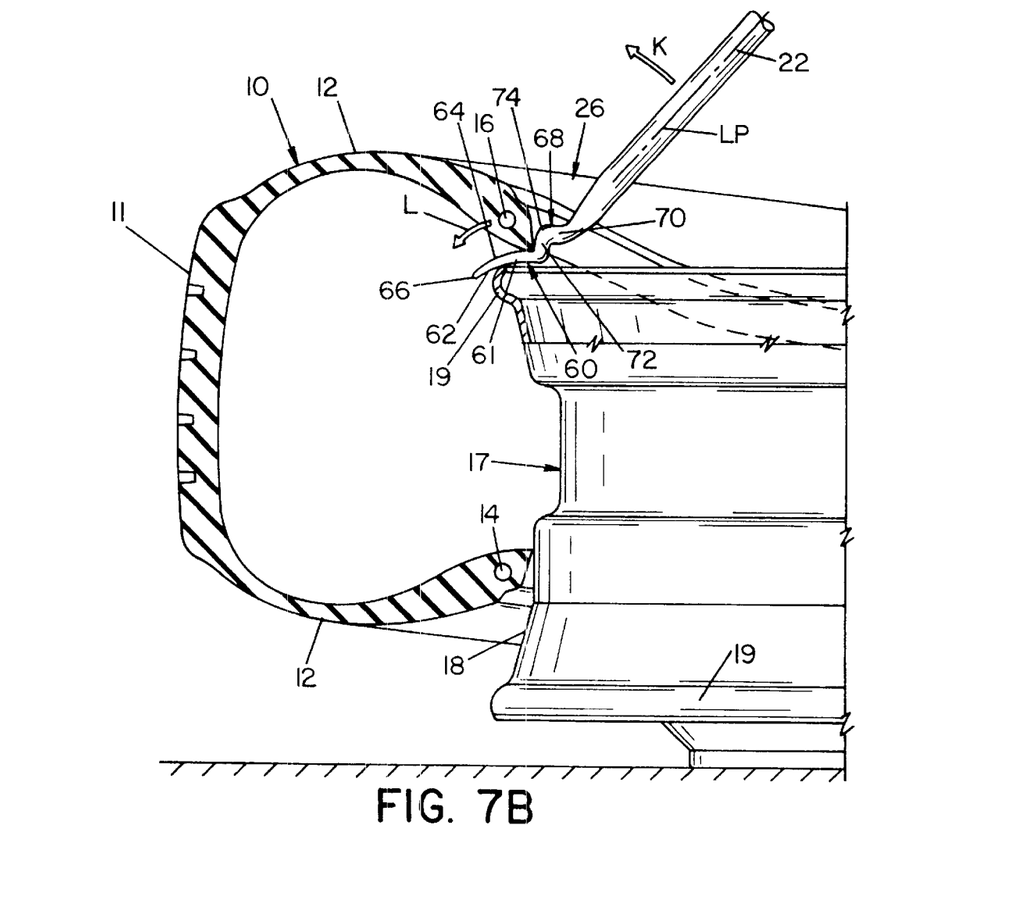
FIG. 7B is an enlarged side elevational view thereof; showing a subsequent leveraging of the final portion of the second bead over the wheel rim by the mounting tool.

Eventually, the user reaches a point where the second bead 16 is extremely taut about rim 17 and overhangs the inside of rim 17, as shown in FIG. 7A. At this point in the mounting procedure, it may be necessary to use second tool end 26. As explained previously, second tool end 26 may be mounted on a separate handle 22 or, as preferable and shown in the preferred embodiment of FIGS. 1–3, second tool end 26 may be integrally provided on the same handle 22 as first tool end 24. Second tool end 26 generally includes a tip 60 that extends axially from handle 22. As best shown in FIGS. 7A and 7B, tip 60 angles outwardly from the longitudinal plane LP of handle 22, whereby facilitating its insertion beneath the overhanging portion of the second bead 16 and above rim flange 19 as shown by arrow M in FIG. 7A. The end 61 of tip 60 extends axially at an upward angle and includes a slight downward radius. The end 61 effectively flattens the end of tip 60 to readily accommodate its insertion between flange 19 and the bead 16. 60. Once inserted, the end 61 does not scrape the tire 10. Subsequent to insertion, the end 61 is utilized to grasp the flange 19. With tip 60 angled, the user may insert tip 60 without having to lower the handle 22 below the height of the second bead 16 as will be appreciated from FIG. 7A.

The tip end 61 includes a preferably arcuate lower surface 62 and a complimentarily arcuate upper surface 64. The lower surface 62 rides along the rim flange 19 as the tip 60 is inserted as shown. To further ease the insertion of tip 60, lower surface 62, and upper surface 64 are, as mentioned previously complimentarily curved. In addition, tip 60 tapers toward a terminal forward and 66.

Once the tip 60 is inserted, the handle 22 is rotated in a direction K to stretch the final portion of the second bead 16 over rim flange 19. To and in this process, second end 26 further includes a raised portion or shoulder 68 interposed between the handle 22 and tip 60. Raised portion 68 may be formed in any known manner and may simply be a protrusion carried on the upper surface 64 of tip 60. As shown, raised portion 68 is formed by an intersecting first segment 70 and second segment 72. First segment 70 extends outward from the longitudinal axis of handle 22 and the second segment 72 extends inward from a terminal end of first segment 70 toward the longitudinal axis of the handle 22. The peak 74 formed at the intersection of the first and second segments 70, 72 extends outward of tip 60. The peak 74 of raised portion 68 is preferably rounded over to reduce the likelihood of damage to the tire 10.

Figure 7C:
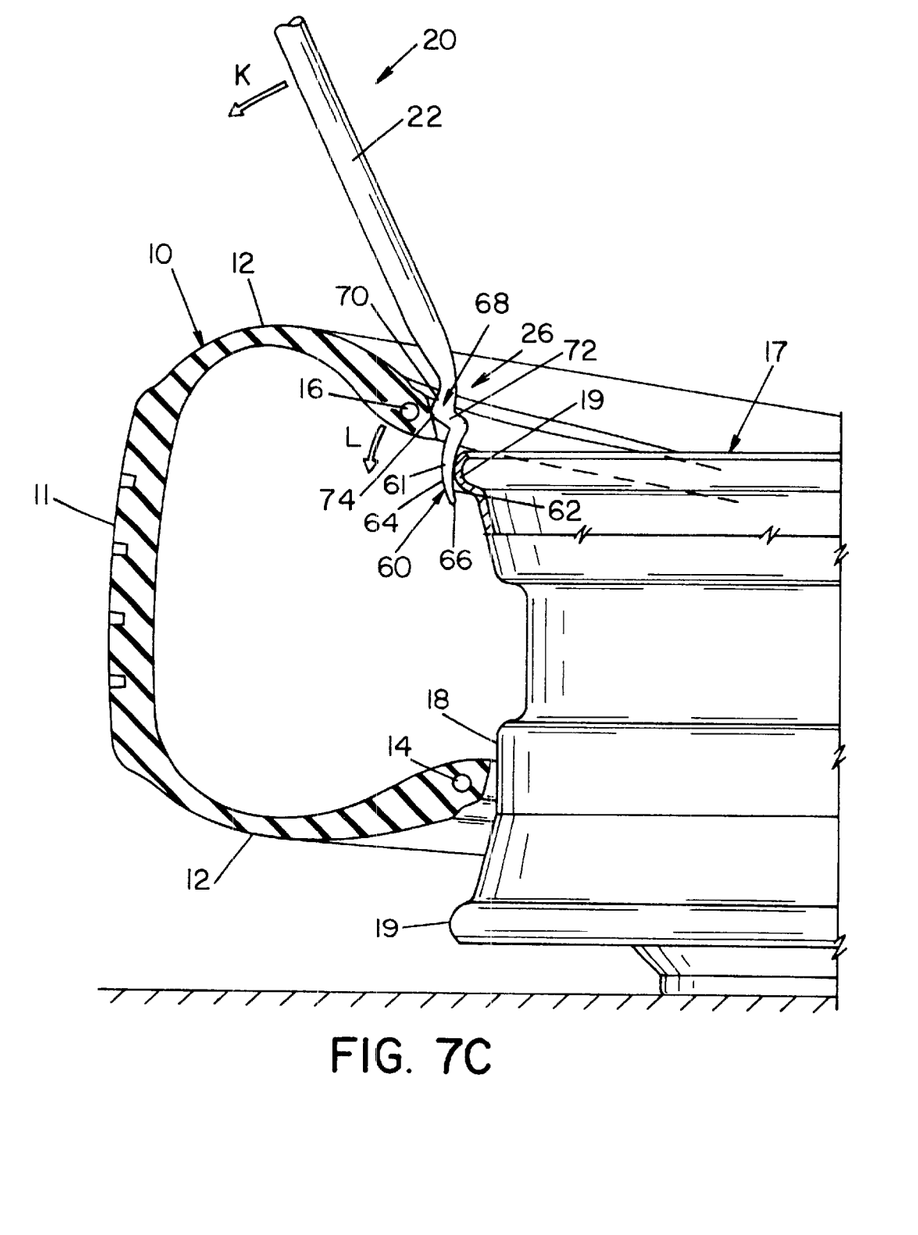
FIG. 7C is an enlarged side elevational view thereof, showing a subsequent leveraging of the final portion of the second bead over the flange of the wheel rim by the mounting tool.
Figure 7D:
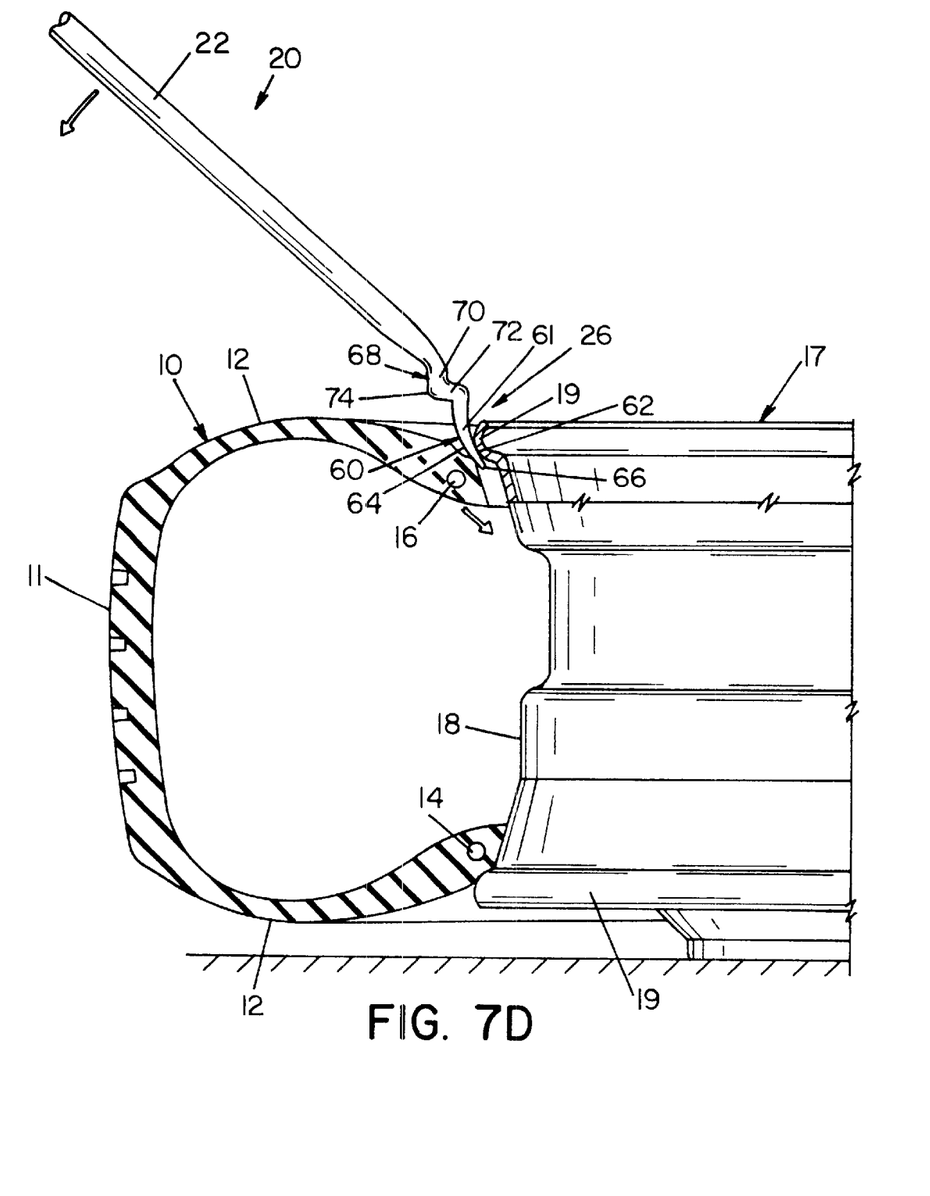
FIG. 7D is an enlarged side elevational view thereof; showing the final portion of the second bead in mounted position over the wheel rim flange.

As best shown in FIG. 7B, raised portion 68 blocks the second bead 16 from riding upward over the length of tip 60 as leverage is applied. As the user rotates handle 22 in the direction of arrow K, raised portion 68 initially applies a force acting to pressure the bead 16 in the direction indicated by arrow I. Such directionally applied leverage stretches the second bead 16 away from rim 17 beyond the outer circumference of rim flange 19. As the handle 22 passes the vertical position, FIG. 7C, the raised portion 68 exerts a downward force against the second bead 16 causing the second bead 16 to travel downward below rim flange 19. As the tip 60 rotates about rim flange 19, its upper surface 64 slopes inwardly relative to the rim 17. The second bead 16 slides along upper surface 64 and is directed thereby inwardly toward the rim 17, eventually sliding over the end 66 of tip 60 and beneath rim flange 19. With the last portion of second bead 16 in place, the tire 10 is mounted.

It should be apparent that the invention as described above satisfies the stated objects among others. The preferred embodiment provides a tire mounting tool having tips a either end which are easy to insert between the tire bead and the wheel rim and easy to remove therefrom. With regard to end 24, the tip 28 is offset from the longitudinal axis of handle 22 by the segment 30 and includes complimentarily angled first and second segments 38, 42 which adjoin at knuckle 40. Second segment tapers to edge 44. Such a configuration facilitates access to the bead and wheel rim interface and applies advantageously directed forces against the tire bead during the leveraging procedure.

In addition, the extraction flange, delta-shaped wing 50, is configured and positioned to efficiently assist in the removal of tip 28 from between the tire bead and the wheel rim. Wing 50, it will be noted, extends outward beyond opposite lateral sides of the tip 28, as will be seen from FIG. 1. The preferred symmetrical extension of wing 50 beyond both opposite sides of the tip 28 allows the wing 50 to assist in the extraction of tip 28 from either side. Moreover, the plane of wing 50 is displaced from the plane of the tip 28 in a forward direction toward the longitudinal axis of the handle 22 as will be seen in FIG. 2. The plane of wing 50 is substantially adjacent and parallel with the plane of the tip 28 such that the lower edge 52 of the wing 50 is normally disposed relative to the tip 28. The offset or displacement of the plane of wing 50 from the plane of the tip 28 allows the edge 52 to readily make contact against the wheel rim (see FIGS. 5A–C and 6D). Were the edge 52 to lie in the same plane, the degree of surface to surface area contact between the edge 52 and the wheel rim would be reduced or eliminated all together. Moreover, the contact between the end 54 of edge 52 and the wheel rim necessary to provide a fulcrum to leverage tip 28 out would be difficult to establish and maintain. Without positive engagement between the end 54 of edge 52 and the wheel rim, an effectively operable fulcrum is not attainable. The wing 50, being offset from the plane of tip 50, provides positive means for engagement against the wheel rim and avoids contact with the tire sidewall during the application of leverage to the tip 28 and during the extraction of the tip 28. While the plane of the entire wing 50 lies, in the preferred embodiment, adjacent to and above the general plane of the tip 28, other modifications contemplated by the invention may be devised in when only the portion of the wing 50 intended to contact the wheel rim is offset from the tip 28. In such a modified configuration, a portion of the wing 5 may be relatively coplanar with the tip 28 while only the wheel rim engagement portion or surface of wing 50 is offset from and adjacent to tip 28.

Not only is the tip 28 of end 24 easy to insert and remove, but the subject tool also provides positive means for maintaining the tire bead in a low position on the shaft 27. The location and configuration of shoulder 34 deters the tire bead from riding up the shaft segment 27 and keeps the bead at a lower position where maximum leverage may be applied. Finally, as will be appreciated from FIG. 6B, the present tire mounting tool tip 28 is configured to provide means for applying a downward force (direction arrow N) against the bead 16. The arcuate lower surface of tip 28 applies a downward directional force on the bead 16 to encourage the bead into the wheel rim and over the wheel rim flange 19.

It should be understood that the preceding is merely a detailed description of a preferred embodiment of this invention and that various modifications and equivalents can be made without departing from the spirit or scope of the invention. The preceding description, therefore, is not meant to limit the scope of the invention. Rather, the scope of the invention is to be determined by the appended claims and their equivalents.

What is claimed is:

1. A mounting tool for mounting a tire onto a wheel rim, the tool comprising:
   an elongate handle having a first end and a second end;
   a first mounting end adjacent said first end of said handle;
   said first mounting end including a shaft extending axially from an end of said handle and a tip extending axially from an end of said shaft;
   a wing affixed to said shaft at a location above said tip and said wing including a dependent wheel rim engaging surface positioned inward and adjacent to said tip.

2. The mounting tool of claim 1, said shaft further comprising an outwardly directed raised portion.

3. The mounting tool of claim 2, wherein said shaft curves inward between said raised portion and said tip.

4. The mounting tool of claim 1, wherein said tip includes:
   a dependent first segment extending outward from said shaft end at a first angle;
   a dependent second segment extending inward from said first segment at an angle complimentary to said first angle; and
   a knuckle defined at an intersection of said first and second segments.

5. The mounting tool of claim 1, further comprising an offset shaft segment interposed between said first end of said handle and said shaft, said offset shaft segment extending outward and downward from said first end of the handle whereby laterally offsetting said first mounting end of the tool from the longitudinal axis of said handle.

6. The mounting tool of claim 5, wherein said shaft and said offset shaft segment converge at a joint and said shaft projects inward between said joint and said tip.

7. The mounting tool of claim 6, wherein said joint is rounded.

8. The mounting tool of claim 6, wherein said tip includes:
   a dependent first segment extending outward from said shaft end;
   a dependent second segment extending inward from said first segment; and
   a knuckle defined at an intersection of said first and second segments.

9. The mounting tool of claim 5, wherein said offset member extends outward from said first end of said handle.

10. The mounting tool of claim 1, wherein said wheel rim engaging surface of said wing includes wheel rim engaging portions disposed on opposite sides of said shaft.

11. The mounting tool of claim 10, wherein said wheel rim engaging surface of said wing terminates at opposed corners.

12. The mounting tool of claim 11, wherein said corners are rounded.

13. The mounting tool of claim 1, further comprising a second mounting end adjacent said second end of said handle, said second mounting end including a second tip extending outward from said second end at an angle relative to a longitudinal axis of the elongate handle.

14. The mounting tool of claim 13, wherein said tip includes an inwardly directed end portion.

15. The mounting tool of claim 13, wherein said second mounting end comprising an outwardly directed raised portion located between said tip and said second end of said handle.

16. The mounting tool of claim 15, wherein said raised portion includes:
   a first segment extending outward from said second end of said handle;
   a second segment extending inward from said first segment; and
   a peak defined between said first and second segments.

17. A mounting tool for mounting a tire onto a rim, the tool comprising:
   a handle having a first end and a second end;
   a first mounting end adjacent said first end, said first mounting end including a tip having sides; and
   a wing affixed to said first mounting end and positioned inward and adjacent said tip and having a wing portion extending outward beyond at least one said side of said tip.

18. The mounting tool of claim 17, wherein said wing extends outward and downward from said first mounting end and terminates at an edge.

19. The mounting tool of claim 18, wherein said edge is perpendicular to the first mounting end tip.

20. The mounting tool of claim 19, wherein said wing has at least one side that joins said edge at a rounded corner.

21. The mounting tool of claim 17, wherein said wing is symmetrical about said tip.

22. The mounting tool of claim 17, further comprising a second mounting end adjacent said second end of said handle, said second mounting end including a second tip extending outward from said second end at an angle.

23. The mounting tool of claim 22, wherein an end of said second tip extends outward from said tip.

24. The mounting tool of claim 22, further comprising an outwardly directed raised portion carried by said second mounting end between said tip and said second end of said handle.

25. The mounting tool of claim 24, wherein said raised portion includes:
   a first segment extending outward from said second end of said handle;
   a second segment extending axially inward from said first segment; and
   a peak defined between said first and said second segments.

26. A mounting tool for mounting a tire onto a rim, the mounting tool comprising:
   a handle having a first end, a second end, and a longitudinal plane;
   mounting end adjacent said second end;
   said mounting end including a tip extending axially outward and at an offset angle relative to the longitudinal plane, wherein an end of said tip extends substantially parallel to the longitudinal plane;
   wherein said mounting end further comprises an outwardly directed raised portion positioned between said tip and said end of said handle;
   wherein said raised portion includes:
     a first segment extending outward from said second end of said handle;
     a second segment extending inward from said first segment; and
     a peak defined between said first and said second segments.

27. The mounting tool of claim 26, wherein said peak is located laterally inward of said second end of said handle.

* * * * *